(12) United States Patent
Sharma et al.

(10) Patent No.: US 9,234,331 B1
(45) Date of Patent: Jan. 12, 2016

(54) DYNAMIC DEADBAND FOR AUTOMATIC ARTICULATION

(71) Applicant: Caterpillar Inc., Peoria, IL (US)

(72) Inventors: Amit Sharma, Peoria, IL (US); Steven C. Budde, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/323,714

(22) Filed: Jul. 3, 2014

(51) Int. Cl.
*A01B 69/00* (2006.01)
*E02F 9/22* (2006.01)
*E02F 9/08* (2006.01)
*B62D 12/00* (2006.01)

(52) U.S. Cl.
CPC ............... *E02F 9/225* (2013.01); *B62D 12/00* (2013.01); *E02F 9/0841* (2013.01)

(58) Field of Classification Search
CPC ...... B62D 15/025; B62D 15/02; B62D 12/00; B62K 21/00; B60W 10/20; B60G 2800/244; B60Q 2300/122; B60Q 2300/128; E02F 9/0841
USPC ..................... 701/41, 42, 36, 45, 70, 96, 300; 180/422
See application file for complete search history.

(56) References Cited

U.S. PATENT DOCUMENTS

| | | | |
|---|---|---|---|
| 4,720,791 A * | 1/1988 | Daido ............................. 701/43 |
| 4,771,851 A * | 9/1988 | Nystuen et al. ................ 180/419 |
| 4,834,204 A * | 5/1989 | Ito et al. ......................... 180/415 |
| 4,856,607 A * | 8/1989 | Sueshige et al. ............... 180/422 |
| 6,684,975 B2 | 2/2004 | Rudolph |
| 7,139,621 B2 | 11/2006 | Gharsalli |
| 7,793,965 B2 | 9/2010 | Padula |
| 8,046,134 B2 | 10/2011 | Huang et al. |
| 8,321,090 B2 | 11/2012 | Sakuma |
| 8,428,824 B2 | 4/2013 | Kim |
| 8,548,680 B2 | 10/2013 | Ryerson et al. |
| 8,612,095 B2 | 12/2013 | Kojo et al. |
| 2005/0288834 A1 | 12/2005 | Heiniger et al. |
| 2011/0035109 A1 | 2/2011 | Ryerson et al. |
| 2013/0226412 A1 | 8/2013 | Kunihiro et al. |

FOREIGN PATENT DOCUMENTS

| | | |
|---|---|---|
| EP | 2404808 | 1/2012 |
| JP | 2005042393 | 2/2005 |
| WO | 2008073045 | 6/2008 |

\* cited by examiner

*Primary Examiner* — Getrude Arthur Jeanglaude
(74) *Attorney, Agent, or Firm* — Miller, Matthias & Hull LLP; Edward Lin

(57) ABSTRACT

An articulation control system for a machine may include an actual steering sensor configured to provide a signal indicative of an actual steering angle, a timer configured to provide a signal indicative of an elapsed predetermined period of time, and a controller in communication with the actual steering sensor and the timer. The controller may be configured to regulate automatic articulation to zero based on signals received from the actual steering sensor and the timer.

20 Claims, 5 Drawing Sheets

DYNAMIC DEADBAND FOR AUTOMATIC ARTICULATION

FIELD OF THE DISCLOSURE

The present disclosure relates generally to articulated machines and, more particularly, to articulation control systems and methods for articulated machines.

BACKGROUND OF THE DISCLOSURE

Earth-moving machines, such as motor graders, are typically used for sculpting a surface of a construction site or roadway to a final shape and contour. Motor graders may be articulated, including a front frame and a rear frame connected together at an articulation joint. For example, the front frame may support a blade for grading the surface of the construction site or roadway, and the rear frame may support an operator cab and an engine. The engine may be operatively coupled to a set of rear tires for primary propulsion of the machine. The set of rear tires may include two pairs of tires with two axles in tandem, while the front frame may include one pair of tires on a front axle.

Generally, steering of the machine is a function of both front tire steering and articulation of the front frame relative to the rear frame. Due to the numerous controls currently needed for steering, controlling articulation, and positioning the blade, operators may experience difficulty and fatigue during operation. As a result, there is a need for sophisticated articulation control systems and methods that help minimize operator input for articulation control, thereby enabling convenient overall operation of the machine.

For example, U.S. Pat. No. 8,548,680, entitled, "Steering System with Automated Articulation Control," describes a system and method of improving steering control for an articulated machine having front wheel steering. The system of the '680 patent receives steering commands from the operator. Based upon the steering commands or signals indicative of front wheel steering angle, the system of the '680 patent automatically commands articulation so that the rear frame will always be tracking the front frame of the machine. Thus, a controller of the '680 patent automatically controls an articulation angle based on a steering angle.

It should be appreciated that the solution of any particular problem is not a limitation on the scope of this disclosure or of the attached claims except to the extent expressly noted. Additionally, this background section discusses observations made by the inventors; the inclusion of any observation in this section is not an indication that the observation represents known prior art except that the contents of the indicated patent represent a publication. With respect to the identified patent, the foregoing summary thereof is not intended to alter or supplement the prior art document itself; any discrepancy or difference should be resolved by reference to the document itself.

SUMMARY OF THE DISCLOSURE

In accordance with one embodiment, an articulation control system for a machine may include an actual steering sensor configured to provide a signal indicative of an actual steering angle, a timer configured to provide a signal indicative of an elapsed predetermined period of time, and a controller in communication with the actual steering sensor and the timer. The controller may be configured to regulate automatic articulation to zero based on signals received from the actual steering sensor and the timer.

In accordance with another embodiment, a method for controlling an articulation of a machine is disclosed. The machine may have a controller. The method may comprise the controller determining the machine is driving in a straight line direction of travel; and the controller increasing a standard dead band on articulation error upon determining the machine is driving in the straight line direction of travel.

In accordance with yet another embodiment, an articulated machine may include a first frame, a second frame, and actual steering sensor, and a controller. The first frame may include a first traction device and a steering apparatus operable to control an actual steering angle of the first traction device. The second frame may be pivotally coupled to the first frame at an articulation joint and may include a second traction device. The actual steering sensor may be configured to provide a signal indicative of the actual steering angle of the first traction device. The controller may be in operative communication with the first frame, the second frame, and the actual steering sensor. The controller may be configured to regulate an articulation angle between the first frame and the second frame to zero when the actual steering angle of the first traction device is within a dead band range of actual steering angles.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

The present disclosure provides a system and method for controlling an articulation of a machine. The system and method provide an automatic articulation control with a dynamic dead band in order to eliminate oversensitivity to minor steering corrections around center. For example, when an operator is steering the machine in a straight line direction of travel (e.g., over an uneven surface), instead of automatic articulation following a steering angle of the machine, an articulation angle may be regulated to zero within a dead band range for steering angles. As a result, undesired articulation or wiggling of the machine during an automatic articulation mode may be reduced. In addition, the system and method may require certain conditions to be met before applying the dead band in order to ensure articulation to zero is appropriate.

Reference will now be made in detail to specific embodiments or features, examples of which are illustrated in the accompanying drawings. Generally, corresponding reference numbers will be used throughout the drawings to refer to the same or corresponding parts.

Figure 1:
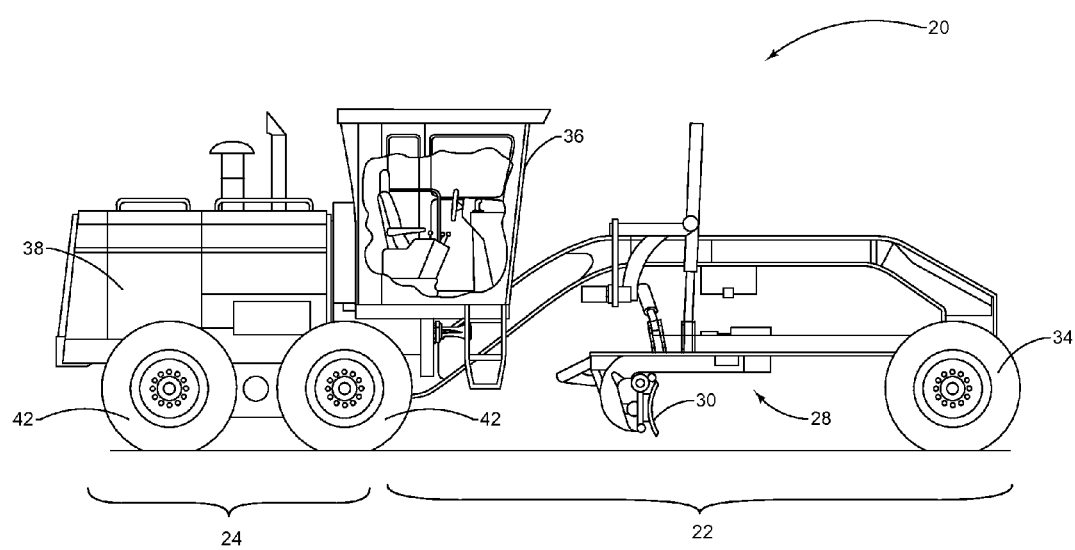
FIG. 1 is a side view of a machine constructed in accordance with one embodiment of the present disclosure.

FIG. 1 illustrates a machine 20 consistent with certain embodiments of the present disclosure. It is to be understood that although the machine 20 is illustrated as a motor grader, the machine may be of any other articulated type. As used herein, the term "machine" refers to a mobile machine that performs a driven operation involving physical movement associated with a particular industry, such as, without limitation, landscaping, construction, mining, agriculture, transportation, forestry, etc.

Non-limiting examples of machines include commercial and industrial machines, such as, motor graders, trucks, earth-moving vehicles, mining vehicles, backhoes, material handling equipment, agricultural equipment, marine vessels, on-highway vehicles, or other types of machines that operate in a work environment. It is also to be understood that the machine 20 is shown primarily for illustrative purposes to assist in disclosing features of various embodiments, and that FIG. 1 does not depict all of the components of a machine.

Figure 2:
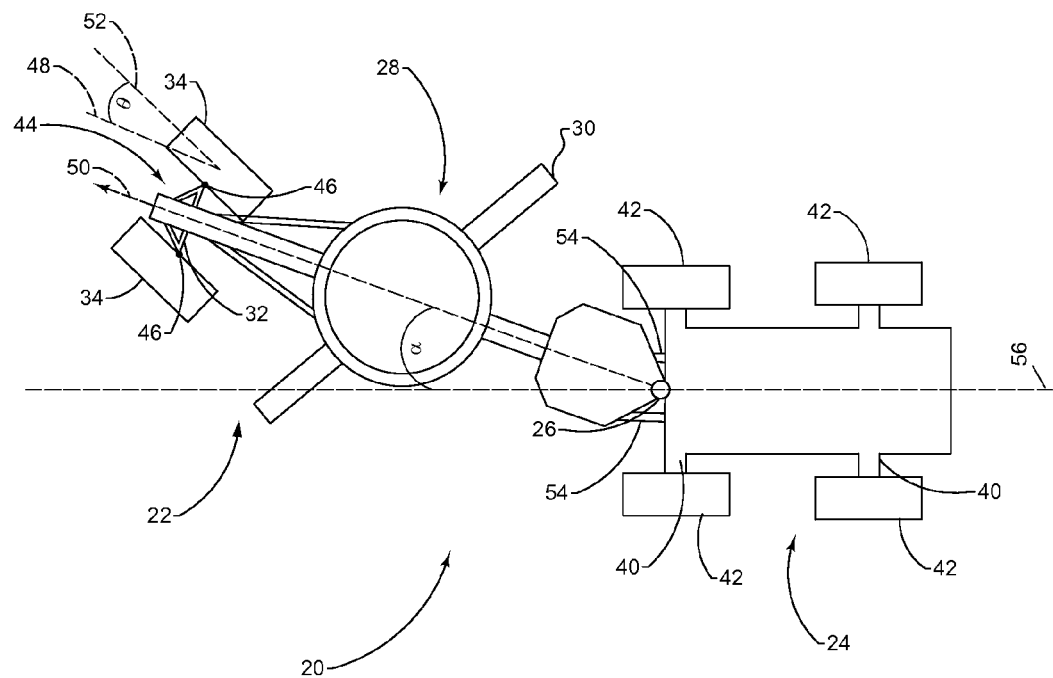
FIG. 2 is a diagrammatic top view of the machine of FIG. 1.

As shown in FIGS. 1-2, machine 20 may include a front frame 22, a rear frame 24, and an articulation joint 26 pivotally connecting the front frame 22 and the rear frame 24. The machine may further include a blade assembly 28 (and/or other work implement), which may be used to move a blade 30 for grading a surface of a construction site or roadway. The front frame 22 may support the blade assembly 28 and a front axle 32 with a pair of front wheels 34 (or other traction devices). The rear frame 24 may support an operator cab 36, an engine 38 (or other power source), and rear axles 40 with two pairs of rear wheels 42 (or other traction devices) in tandem. It is to be understood that other configurations are certainly possible.

Steering of the machine 20 may be accomplished through a combination of both front wheel steering and machine articulation. A steering apparatus 44, which may include a linkage and a hydraulic cylinder (not shown), may be used for steering the front wheels 34 about front wheel pivot points 46. For example, as shown in FIG. 2, an actual steering angle $\theta$ may be defined between a longitudinal axis 48 parallel to a longitudinal axis 50 of the front frame 22 and a longitudinal axis 52 of the front wheels 34. An origin of the actual steering angle $\theta$ may be at the front wheel pivot point 46.

In one example, the actual steering angle $\theta$ may range from −50° to 50°, with 0° being attributed to an alignment of the longitudinal axis 52 of the front wheels 34 to the longitudinal axis 48, a positive $\theta$ associated with right steering, and a negative $\theta$ associated with left steering. However, other numerical ranges and references may certainly be possible. Although only shown in connection with a right front wheel of the front wheels 34, it is to be understood that the actual steering angle $\theta$ applies equally to a left front wheel of the front wheels 34 as well.

Connected between the front frame 22 and the rear frame 24, articulation cylinders 54 may be used to pivot the front frame 22 relative to the rear frame 24 about the articulation joint 26. For example, as shown in FIG. 2, an actual articulation angle $\alpha$ may be defined between the longitudinal axis 50 of front frame 22 and a longitudinal axis 56 of rear frame 24. An origin of the actual articulation angle $\alpha$ may be at the articulation joint 26. In one example, the actual articulation angle $\alpha$ may range from −20° to 20°, with 0° being attributed to an alignment of the longitudinal axes 50, 56 of the front and rear frames 22, 24, a positive angle $\alpha$ associated with a right articulation, and a negative angle $\alpha$ associated with a left articulation in this particular example. However, other numerical ranges and references may certainly be possible.

Figure 3:
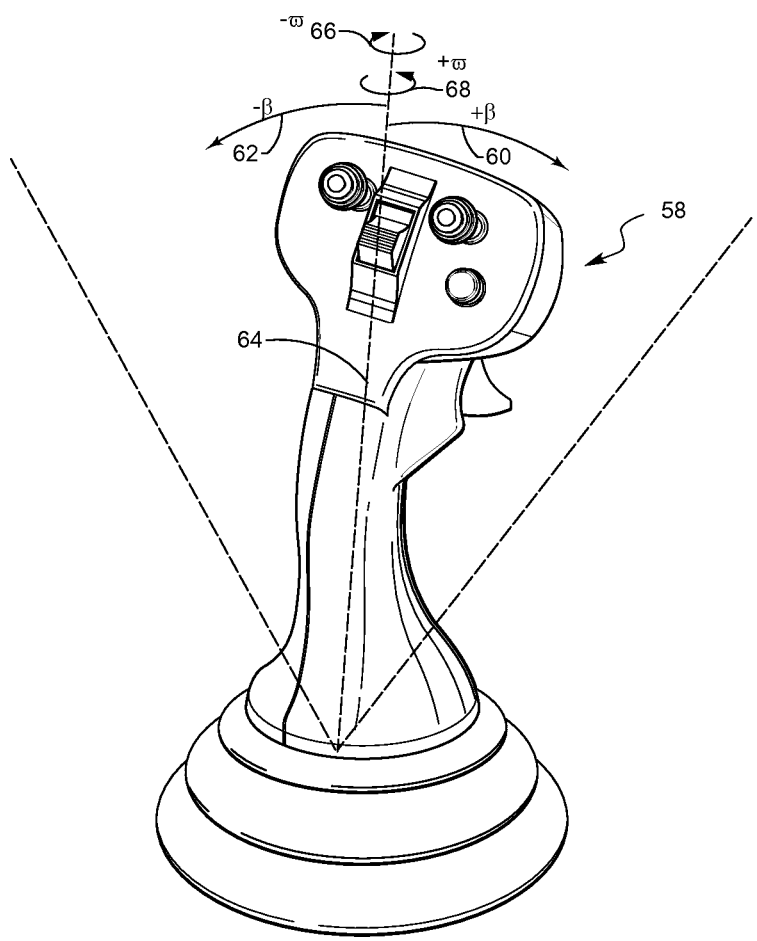
FIG. 3 is a perspective view of a joystick of the machine of FIG. 1.

An operator of the machine 20 may manually control steering and articulation via an operator interface. As shown in FIG. 3, the operator may manipulate a joystick 58 and/or other type of operator control in order to input a desired steering angle $\beta$ and a desired articulation angle $\omega$ (or a desired rate of change of the articulation angle $\alpha$). For example, the operator may tilt the joystick 58 in a right direction 60 or a left direction 62 relative to a neutral axis 64 in order to steer the machine 20 right or left, respectively.

A position of the joystick 58 relative to the neutral axis 64 may represent the desired steering angle $\beta$, or an angular amount by which the operator wishes to steer the machine 20 in order to control front wheel steering and the actual steering angle $\theta$. For example, a positive $\beta$ may be associated with the joystick 58 tilted in the right direction 60, a negative $\beta$ may be associated with the joystick 58 tilted in the left direction 62, and 0° may be associated with the joystick 58 in alignment with the neutral axis 64. However, other numerical ranges and references may certainly be possible.

In order to manually control articulation, the operator may twist the joystick 58 in a clockwise direction 66 or a counter-clockwise direction 68 about the neutral axis 64 in order to articulate the machine 20 right or left, respectively. An amount of rotation of the joystick 58 about the neutral axis 64 may represent the desired articulation angle $\omega$, or an angular rate of change of articulation by which the operator wishes to articulate the machine 20 in order to control the front and rear frames 22, 24 and the actual articulation angle $\alpha$. Although other configurations are possible, a positive $\omega$ may be associated with the joystick 58 rotated in the clockwise direction 66, a negative $\omega$ may be associated with the joystick 58 rotated in the counter-clockwise direction 68, and 0° may be associated with no rotation of the joystick 58.

It is to be understood that other types of operator controls than the joystick 58, described herein, may be used to control steering and articulation. For example, push button controls, steering wheels, etc. may be used in place of or in addition to the joystick 58. Furthermore, steering and articulation may be controlled independent of each other, e.g., two separate joysticks, one for steering and one for articulation, and other configurations are certainly possible.

FIG. 3 may illustrate the joystick 58 in a neutral position. However, it is to be understood that the joystick 58 may be moved in a wide variety of positions for manual steering and articulation of the machine 20.

Figure 4:
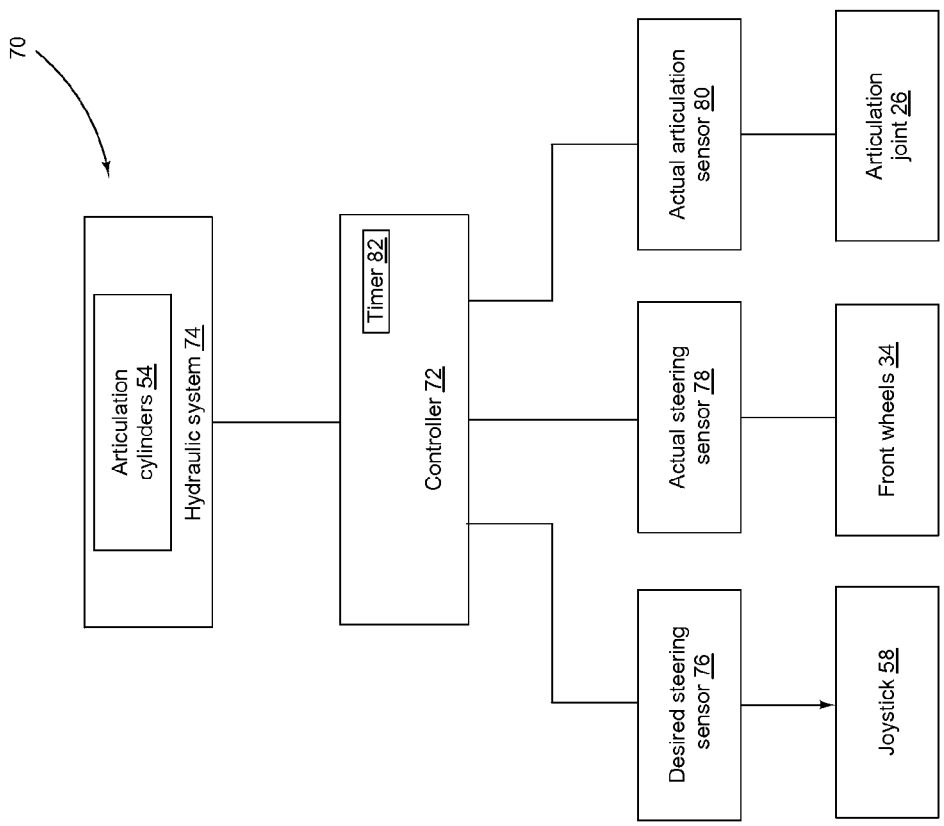
FIG. 4 is a block diagram of an articulation control system for the machine of FIG. 1.

Referring now to FIG. 4, with continued reference to FIGS. 1-3, the machine 20 may include an articulation control system 70. The articulation control system 70 may comprise a controller 72 in communication with a hydraulic system 74, a plurality of sensors 76, 78, and 80, and a timer 82. The controller 72 may comprise a processor (e.g., "computer processor") or processor-based device that may include or be associated with a non-transitory computer readable storage medium having stored thereon computer-executable instructions. It is understood that the articulation control system 70 and controller 72 may include other hardware, software, firmware, or combinations thereof.

The hydraulic system 74 may be configured to operate articulation cylinders 54, thereby controlling the actual articulation angle $\alpha$ between the front and rear frames 22, 24, based on signals received from the controller 72. For example, the hydraulic system 74 may include one or more pumps, motors, valves, cylinders, controllers, hydraulic drives, electric drives, combinations thereof, etc. Furthermore, the signals from the controller 72 may be, for example, electro-hydraulic signals that control operation of the hydraulic system 74.

The plurality of sensors may include a desired steering sensor 76, an actual steering sensor 78, and an actual articulation sensor 80. The desired steering sensor 76 may be configured to provide a signal indicative of a desired steering angle to the controller 72. For example, the desired steering sensor 76 may detect the desired steering angle β (FIG. 3) of the joystick 58 based on operator input. More specifically, the desired steering sensor 76 may be used to measure a position of the joystick, which may be transformed into a desired steering angle of the operator. However, other types of sensors and configurations may be used to provide a signal indicative of the desired steering angle.

The actual steering sensor 78 may be configured to provide a signal indicative of an actual steering angle to the controller 72. More specifically, the actual steering sensor 78 may directly or indirectly detect the actual steering angle θ (FIG. 2) and/or a position of the front wheels 34 (FIG. 2). For example, the actual steering sensor 78 may comprise an angular sensor used to directly measure an angular position of the front wheels 34.

In another example, the actual steering sensor 78 may comprise a cylinder displacement sensor which may measure a linear position of steering cylinders of the front wheels 34. Measurements gathered by the cylinder displacement sensor may then be used by the controller 72 to calculate the actual steering angle θ. However, it is to be understood that other types of sensors and configurations may also be used to provide a signal indicative of the actual steering angle.

The actual articulation sensor 80 may be configured to provide a signal indicative of an actual articulation angle to the controller 72. More specifically, the actual articulation sensor 80 may directly or indirectly detect the actual articulation angle α (FIG. 2). For example, the actual articulation sensor 80 may comprise an angular sensor that directly detects the actual articulation angle α (FIG. 2) at the articulation joint 26 between the front and rear frames 22, 24.

In another example, the actual articulation sensor 80 may comprise a linear cylinder position sensor, which may measure a length of the articulation cylinder 54. Measurements gathered by the linear cylinder position sensor may then be used by the controller 72 to calculate the actual articulation angle α or to determine the actual articulation angle α based on known corresponding cylinder lengths. However, it is to be understood that other types of sensors and configurations may also be used to provide a signal indicative of the actual articulation angle.

The timer 82 may be configured to provide a signal indicative of an elapsed predetermined period of time. Separate from or integral to the controller 72, the timer 82 may be configured to measure an amount of time that has passed. For example, the timer 82 may receive a command from the controller 72 to start tracking a period of time. Once the period of time has elapsed, the timer 82 may send a signal to the controller 72 indicating the period of time has elapsed.

Furthermore, the articulation control system 70 may provide automatic articulation control of the machine 20. For example, the operator may select (e.g., via the operator interface) to operate the machine 20 in an auto-articulation mode. In auto-articulation mode, the control system 70 may automatically control the actual articulation angle α of the machine 20 to follow the actual steering angle θ. More specifically, based on the actual steering angle θ detected by the actual steering sensor 78, the controller 72 may calculate a target articulation angle depending on parameters and formulae programmed into a memory associated with the controller 72.

In one example, with the actual steering angle θ range from −50° to 50° and the actual articulation angle α range from −20° to 20°, the controller 72 may calculate the target articulation angle based on a preprogrammed relationship with the actual steering angle θ. For instance, when the actual steering angle θ is within −10° to 10°, articulation may have a linear relationship. Therefore, the target articulation angle set by the controller 72 may be the same as the actual steering angle θ. However, it is to be understood other correlations between the actual steering angle θ and target articulation angle are certainly possible.

When the actual steering angle θ is outside of −10° to 10°, then a ratio of the actual steering angle θ to the target articulation angle may be four-to-one (4:1). Therefore, if the actual steering angle θ is between −50° to −10° or between 10° to 50°, then the controller 72 may calculate the target articulation angle by dividing the actual steering angle θ by four (4). However, other correlations between the actual steering angle θ are certainly possible.

Based on the target articulation angle and the actual articulation angle α detected by the actual articulation sensor 80, the controller may determine an articulation error. The articulation error may correspond to a difference between the actual articulation angle α and the target articulation angle. For example, to determine the articulation error, the actual articulation angle α may be subtracted from the target articulation angle. After determining the articulation error, the controller 72 may send a corresponding signal to the hydraulic system 74 in order to adjust the actual articulation angle α to achieve the target articulation angle.

Figure 5:
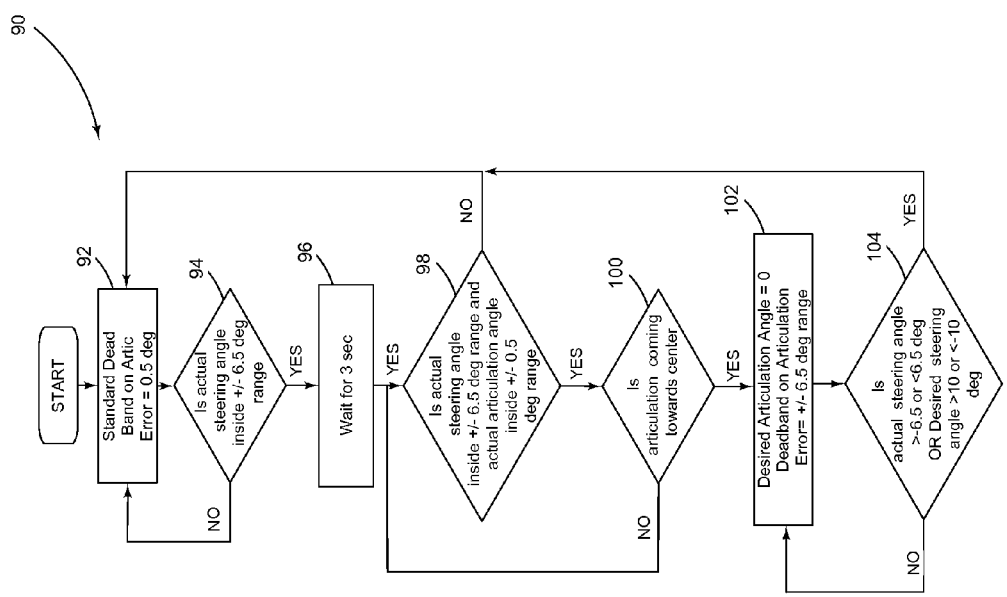
FIG. 5 is a flowchart illustrating a process for controlling an articulation of a machine according to another embodiment.

Turning now to FIG. 5, with continued reference to FIGS. 1-4, a flowchart illustrating a process 90 for controlling articulation of the machine 20 is shown. In the auto-articulation mode, the articulation control system 70 may provide a wider dead band in order to decrease sensitivity to small steering corrections, such as, when the operator is steering the machine in a straight line direction of travel. More specifically, the controller 72 of the articulation control system 70 may be programmed according to the process 90 illustrated in FIG. 5.

At block 92, the controller 72 may be configured to apply a standard dead band on the articulation error in order to filter noise on the signal for the articulation error. A small amount of articulation error may correspond to the noise on the actual steering angle θ. Therefore, instead of commanding articulation to follow steering, the controller 72 may not change the actual articulation angle α, thereby reducing an effect of the noise on the steering signal.

For example, the standard dead band may have a total range of 0.5° on the articulation error, such as, from −0.25° to 0.25°, although other ranges are certainly possible. When the articulation error is within the standard dead band, the controller 72 may set the articulation error to zero such that articulation is not moved. In so doing, vibration of the machine 20 due to the articulation tracking the noise on the steering is eliminated when the machine 20 in the auto-articulation mode.

The controller 72 may be configured to increase the standard dead band to a larger dead band range in order to eliminate oversensitivity to minor steering corrections. For example, when an operator is steering the machine in a straight line direction of travel, such as, over an uneven surface, the machine 20 may experience undesired articulation or wiggling when articulation is commanded to follow steering in the auto-articulation mode. To address this, the controller 72 may be configured to regulate articulation to zero within a dead band range of steering angles.

At block 94, the controller 72 may be configured to determine whether the actual steering angle θ is within a dead band range of actual steering angles. For example, the dead band range of actual steering angles may be from −6.5° to 6.5°, although other ranges are certainly possible. The dead band range of actual steering angles may be programmed into the memory associated with the controller 72. The controller 72 may determine whether the actual steering angle θ is within the dead band range of actual steering angles based on signals indicative of the actual steering angle θ received from the actual steering sensor 78.

If the actual steering angle θ is outside of the dead band range of actual steering angles, this may signify that the operator is not steering the machine in a straight line direction of travel. Therefore, the process 90 may proceed to block 92, and the standard dead band does not change. If the actual steering angle θ is within the dead band range of actual steering angles, this may signify that the operator is steering the machine in a straight line direction of travel. Therefore, the process 90 may proceed to block 96.

The controller 72 may be configured to check that certain conditions are met before increasing the standard dead band. For example, when the operator performs a full steering sweep from one side to another, the actual steering angle θ may be within the dead band range of actual steering angles. However, because the operator is performing a full steering sweep, it may be undesirable for articulation to be regulated to zero in the auto-articulation mode. To address this, at block 96, the controller 72 may be configured to wait for a predetermined period of time.

For example, the predetermined period of time may be three seconds (3 s), although other time periods are certainly possible. The predetermined period of time may be programmed into the memory associated with the controller 72. Based on signals received from the timer 82, the controller 72 may determine when the predetermined period of time has elapsed. By waiting the predetermined period of time to elapse, the articulation control system 70 may recognize whether the operator is steering the machine from one side to another, such as, in a full sweep, or the operator is keeping the machine at center (within the dead band range of actual steering angles) in a straight line direction of travel.

It is to be understood that other methods may be used to determine if the machine is driving in a straight line direction of travel. For example, the controller 72 may calculate a derivative of the actual steering angle and/or the desired steering angle. Using the derivative of the actual and/or desired steering angle, the controller 72 may then determine whether the wheels are sweeping through center or slowing down to a stop.

After the predetermined period of time has elapsed (or the controller 72 has determined whether the machine 20 is driving straight), the process 90 may proceed to block 98. At block 98, the controller may be configured to determine if the actual steering angle θ is still within the dead band range for actual steering angles. If the actual steering angle θ is outside the dead band range for actual steering angles after the predetermined period of time has elapsed, this may indicate that the operator is steering the machine from one side to the other, such as, in a full sweep. Therefore, the process 90 may proceed to block 92, and the standard dead band does not change.

If the actual steering angle θ is within the dead band range for actual steering angles after the predetermined period of time has elapsed, this may further indicate that the operator is keeping the machine at center and trying to steer in a straight line direction of travel. However, there may be instances when the actual steering angle θ is within the dead band range for actual steering angles for the predetermined period of time but it is undesirable for articulation to be regulated to zero. For example, the operator may have unintentionally stopped steering while on a turn (e.g., when operating the blade 30 or other implements), and automatically regulating articulation to zero is undesired. To address this, at block 98, the controller may also be configured to determine if the actual articulation angle α is within a dead band range of actual articulation angles.

In one example, the dead band range of actual articulation angles may be near zero, e.g., from −0.5° to 0.5°, although other ranges are certainly possible. The dead band range of actual articulation angles may be programmed into the memory associated with the controller 72. Based on signals received from the actual articulation sensor 80, the controller 72 may determine whether the actual articulation angle α is within the dead band range of actual articulation angles.

If the actual articulation angle α is outside the dead band range of actual articulation angles, this may indicate that the operator stopped steering while on a turn. Therefore, the process 90 may proceed to block 92, and the standard dead band does not change. If the actual articulation angle α is within the dead band range of actual articulation angles, this may further indicate that the operator is keeping the machine at center without much articulation and trying to steer in a straight line direction of travel. Therefore, the process 90 may proceed to block 100.

At block 100, a last condition the controller 72 may check before increasing the standard dead band is whether articulation is coming towards center. In order to determine whether the actual articulation angle α is approaching zero, the controller 72 may compare a sign (or polarity) of the actual articulation angle α to a sign (or polarity) of the articulation error. If the actual articulation angle α and the articulation error have the same sign, then articulation may be approaching zero. If the actual articulation angle α and the articulation error have opposite signs, then articulation may be moving away from zero.

In addition, if the target articulation angle is zero and the actual articulation angle α is non-zero, articulation may be approaching zero. If the target articulation angle is non-zero and the actual articulation angle α is zero, articulation may be moving away from zero. If the target articulation angle is zero and the actual articulation angle α is zero, articulation may be at zero. However, other methods may be used to detect whether articulation is coming towards center (e.g., articulation angle is zero). For example, the actual articulation angle α may be captured at different moments of time and subtracted from each other in order to determine a direction of movement.

When the actual articulation angle α is moving away from zero, it may undesirable to force machine articulation to zero. Therefore, the process 90 may proceed to block 92, and the standard dead band does not change. When the actual articulation angle α is approaching zero (or at zero), this may further indicate that the operator is trying to steer in a straight line direction of travel. Therefore, the process 90 may proceed to block 102.

At block 102, the controller 72 may be configured to regulate automatic articulation of the machine 20 to zero. After determining that the actual steering angle θ is within the dead band range of actual steering angles for the predetermined period of time and the actual articulation angle α proximate to and approaching zero, the controller 72 may move the actual articulation angle α to zero and may increase the standard dead band on articulation error.

More specifically, the controller 72 may set the target articulation angle to zero. Therefore, the actual articulation angle α is forced to zero. In addition, the controller 72 may set an increased dead band range on articulation error. For example, the increased dead band range on articulation error may be from −6.5° to 6.5°, although other ranges are certainly possible. In so doing, the dead band may be increased from the standard dead band (e.g., from −0.25° to 0.25° increased to −6.5° to 6.5°).

When the articulation error is within the dead band, the controller 72 may set the desired articulation angle to zero, thereby keeping the actual articulation angle α at zero. Therefore, within the dead band on articulation error, articulation does not follow steering. In so doing, undesired articulation or wiggling due to oversensitivity to minor steering corrections is eliminated when the operator is trying to steer the machine 20 in a straight line direction of travel in the auto-articulation mode.

At block 104, the controller 72 may be configured to determine whether the actual steering angle θ is staying within the dead band range of actual steering angles. As discussed above in reference to block 94, the dead band range of actual steering angles may be from −6.5° to 6.5°, although other ranges are certainly possible. Based on signals received from the actual steering sensor 78, the controller 72 may determine whether the actual steering angle θ is within the dead band range of actual steering angles.

At block 104, the controller 72 may also be configured to determine whether the desired steering angle β is staying within a dead band range of desired steering angles. The dead band range of desired steering angles may be from −10° to 10°, although other ranges are certainly possible. The dead band range of desired steering angles may be programmed into the memory associated with the controller 72. Based on signals received from the desired steering sensor 76, the controller 72 may determine whether the desired steering angle β is within the dead band range of desired steering angles.

If the actual steering angle θ is outside the dead band range of actual steering angles or the desired steering angle β is outside the dead band range of desired steering angles, the controller 72 may stop regulating automatic articulation to zero, and articulation may follow steering in the auto-articulation mode. For example, the process 90 may proceed to block 92, and the dead band on articulation error may be re-set or shrink down to the standard dead band (e.g., from −6.5° to 6.5° decreased to −0.25° to 0.25°). If the actual steering angle θ is within the dead band range of actual steering angles and the desired steering angle β is within the dead band range of desired steering angles, the process 90 may proceed to block 102, and articulation stays at zero (instead of tracking steering).

Automatic articulation of the machine 20 may end when the operator selects (e.g., via the operator interface) to exit the auto-articulation mode. It will be understood that the flowchart in FIG. 5 is shown and described as an example only to assist in disclosing the features of the system and that more or fewer steps than shown, in a same or different order, may be included in the method corresponding to the various features described above for the disclosed system without departing from the scope of the present disclosure.

INDUSTRIAL APPLICABILITY

In general, the foregoing disclosure finds utility in various industrial applications, such as in earthmoving, construction, industrial, agricultural, and forestry machines. In particular, the disclosed operator coaching system and method may be applied to motor graders, trucks, earth-moving vehicles, mining vehicles, backhoes, material handling equipment, agricultural equipment, marine vessels, on-highway vehicles, and the like.

By applying the disclosed articulation control system to a machine, sophisticated and advanced automatic articulation may be provided. In particular, a controller may be configured to apply a dynamic dead band that changes according to sensed parameters and preset conditions, thereby adding enhanced intelligence to an auto-articulation mode. The disclosed articulation control system may determine whether an operator is steering the machine in a straight line direction of travel, and thus, regulate automatic articulation to zero instead of responding to steering commands. In so doing, undesired articulation or wiggling due to oversensitivity to minor steering corrections in the auto-articulation mode may be eliminated. As a result, the disclosed system minimizes operator input for articulation control and enables a convenient overall operation of the machine.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. An articulation control system for a machine, comprising:
an actual steering sensor configured to provide a signal indicative of an actual steering angle;
a timer configured to provide a signal indicative of an elapsed predetermined period of time; and
a controller in communication with the actual steering sensor and the timer, the controller configured to regulate automatic articulation to zero based on signals received from the actual steering sensor and the timer, when the machine is in an auto-articulation mode.

2. The articulation control system of claim 1, wherein the controller is configured to regulate automatic articulation to zero within a dead band range of actual steering angles.

3. The articulation control system of claim 2, further comprising a desired steering sensor in communication with the controller, the desired steering sensor configured to provide a signal indicative of a desired steering angle, the controller configured to regulate automatic articulation to zero within a dead band range of desired steering angles.

4. The articulation control system of claim 2, wherein the controller is configured to regulate automatic articulation to zero when the actual steering angle is within the dead band range of actual steering angles for a predetermined period of time.

5. The articulation control system of claim 4, further comprising an actual articulation sensor in communication with the controller, the actual articulation sensor configured to provide a signal indicative of an actual articulation angle, the controller configured to regulate automatic articulation to zero when the actual articulation angle is within a dead band range of actual articulation angles proximate to zero.

6. The articulation control system of claim 5, wherein the controller is configured to regulate automatic articulation to zero when the actual articulation angle is approaching zero.

7. The articulation control system of claim 6, wherein the controller is configured to set a target articulation angle to zero and set a dead band on an articulation error in order to regulate automatic articulation to zero.

8. The articulation control system of claim 7, wherein the controller is configured to stop regulating automatic articulation to zero when the actual steering angle is outside the dead band range of actual steering angles.

9. The articulation control system of claim 3, wherein the controller is configured to stop regulating automatic articulation to zero when the desired steering angle is outside the dead band range of desired steering angles.

10. The articulation control system of claim 1, wherein the controller is configured to set a standard dead band on an articulation error.

11. A method for controlling an articulation of a machine having a controller, the method comprising:
    the controller determining the machine is driving in a straight line direction of travel; and
    the controller increasing a standard dead band on articulation error upon determining the machine is driving in the straight line direction of travel.

12. The method of claim 11, further comprising the controller increasing a standard dead band on articulation error in order to decrease sensitivity to minor steering corrections when the machine is operating in an automatic articulation mode.

13. The method of claim 11, further comprising the controller receiving a signal from a timer indicative of an elapsed predetermined period of time, and the controller determining the machine is driving in a straight line direction of travel based on the signal received from the timer.

14. The method of claim 11, further comprising the controller receiving a signal from an actual steering sensor indicative of an actual steering angle, and the controller determining the machine is driving in a straight line direction of travel based on the signal received from the actual steering sensor.

15. The method of claim 11, further comprising the controller receiving a signal from an actual articulation sensor indicative of an actual articulation angle, and the controller determining the machine is driving in a straight line direction of travel based on the signal received from the actual articulation sensor.

16. An articulated machine, comprising:
    a first frame including a first traction device and a steering apparatus operable to control an actual steering angle of the first traction device;
    a second frame pivotally coupled to the first frame at an articulation joint, the second frame including a second traction device;
    an actual steering sensor configured to provide a signal indicative of the actual steering angle of the first traction device; and
    a controller in operative communication with the first frame, the second frame, and the actual steering sensor, the controller configured to regulate an articulation angle between the first frame and the second frame to zero when the actual steering angle of the first traction device is within a dead band range of actual steering angles.

17. The articulated machine of claim 16, further comprising a timer in communication with the controller, the controller configured to regulate the articulation angle to zero when the actual steering angle is within the dead band range of actual steering angles for a predetermined period of time.

18. The articulated machine of claim 17, further comprising a desired steering sensor in communication with the controller, the desired steering sensor configured to provide a signal indicative of a desired steering angle from operator input, the controller configured to regulate the articulation angle to zero when the desired steering angle is within a dead band range of desired steering angles.

19. The articulated machine of claim 17, further comprising an actual articulation sensor in communication with the controller, the actual articulation sensor configured to provide a signal indicative of an actual articulation angle between the first frame and the second frame, the controller configured to regulate the articulation angle to zero when the actual articulation angle is within a dead band range of actual articulation angles proximate to zero.

20. The articulated machine of claim 19, wherein the controller is configured to regulate the articulation angle to zero when the actual articulation angle is approaching zero.

* * * * *